United States Patent
Luo et al.

(10) Patent No.: US 9,251,732 B2
(45) Date of Patent: Feb. 2, 2016

(54) METHOD AND SYSTEM FOR IMAGE DITHERING

(71) Applicant: Spreadtrum Communications (Shanghai) Co., Ltd., Shanghai (CN)

(72) Inventors: Xiaowei Luo, Shanghai (CN); Fuhuei Lin, Shanghai (CN)

(73) Assignee: SPREADTRUM COMMUNICATIONS (SHANGHAI) CO., LTD. (CN)

( * ) Notice: Subject to any disclaimer, the term of this patent is extended or adjusted under 35 U.S.C. 154(b) by 0 days.

(21) Appl. No.: 14/238,114

(22) PCT Filed: Feb. 20, 2013

(86) PCT No.: PCT/CN2013/071691
§ 371 (c)(1),
(2) Date: Feb. 10, 2014

(87) PCT Pub. No.: WO2014/127509
PCT Pub. Date: Aug. 28, 2014

(65) Prior Publication Data
US 2015/0213750 A1 Jul. 30, 2015

(51) Int. Cl.
*G09G 3/20* (2006.01)
*H04N 1/64* (2006.01)
*G06T 7/40* (2006.01)
*H04N 1/405* (2006.01)

(52) U.S. Cl.
CPC .............. *G09G 3/2051* (2013.01); *G06T 7/408* (2013.01); *H04N 1/64* (2013.01); *H04N 1/4051* (2013.01)

(58) Field of Classification Search
CPC ........ G09G 3/2051; G06T 7/408; H04N 1/64; H04N 1/4051
See application file for complete search history.

(56) References Cited

U.S. PATENT DOCUMENTS 5,148,273 A * 9/1992 Lippel .................. H04N 5/9261
348/390.1
6,052,113 A    4/2000 Foster
(Continued)

FOREIGN PATENT DOCUMENTS

CN    1662943 A    8/2005
JP    63045974 A    2/1988

OTHER PUBLICATIONS

Extended European Search Report for Application No. 13186290.6-1902; Dated Feb. 17, 2014.
Lawless, W.F.., et al.: "Integrated Scheme for Dithering 24 Bits of True Color Down to 4/8 12 or 16 Bits with Reduced Error", IBM Technical Disclosure Bulletin, vol. 37, No. 06A, IP.Com Journal, IP.Com Inc., West Henrietta, NY, US, Jun. 1, 1994, pp. 179-181.
(Continued)

*Primary Examiner* — Xiao Wu
*Assistant Examiner* — Chong Wu
(74) *Attorney, Agent, or Firm* — Cantor Colburn LLP

(57) ABSTRACT

A method of dithering of an image is described. The method includes analyzing each of a plurality of pixels of the image, wherein each pixel of the plurality of pixels exhibits integer value N-bit color depth and determining a particular index value of each pixel of the image, a particular numerical value associated with a particular color component of each pixel of the image, and a particular threshold value associated with the particular color component of each pixel of the image. The particular threshold value is common between pixels of the image separated by a predetermined number of pixels. The method further includes modifying, based on the determining, each of the plurality of pixels of the image to exhibit integer value M-bit color depth, wherein integer value M is less than integer value N.

21 Claims, 9 Drawing Sheets

(56) References Cited

U.S. PATENT DOCUMENTS

| | | | |
|---|---|---|---|
| 6,134,024 A * | 10/2000 | Miura | H04N 1/4058 358/1.9 |
| 6,154,195 A | 11/2000 | Young et al. | |
| 7,206,001 B1 | 4/2007 | Crandall et al. | |
| 7,253,819 B1 | 8/2007 | Ganea | |
| 2003/0063100 A1* | 4/2003 | Wang et al. | 345/596 |

OTHER PUBLICATIONS

International Search Report for International Patent Application No. PCT/CN2013/071691, mailed Nov. 21, 2013.

First European Office action corresponding to Application No. 13186290.6-1902; Date of Issue: Jan. 16, 2015.

* cited by examiner

FIG. 6

METHOD AND SYSTEM FOR IMAGE DITHERING

CROSS REFERENCE TO RELATED APPLICATIONS

This is the U.S. national stage of application No. PCT/CN2013/071691, filed on 20 Feb. 2013, the disclosure of which is also incorporated herein by reference.

BACKGROUND OF THE DISCLOSURE

Color depth, or bit depth, refers to the number of bits used to indicate or represent pixel color, where 24-bit and 16-bit color depths are frequently encountered in computer graphic applications. While a greater number of pixel colors may be realized with 24-bits, 16-bit images may be desirable in scenarios where, for example, allocation of memory and processing resources are of concern.

SUMMARY

This Summary does not in any way limit the scope of the claimed subject matter.

A method of dithering of an image is described. The method includes analyzing each of a plurality of pixels of the image, wherein each pixel of the plurality of pixels exhibits integer value N-bit color depth and determining a particular index value of each pixel of the image, a particular numerical value associated with a particular color component of each pixel of the image, and a particular threshold value associated with the particular color component of each pixel of the image. The particular threshold value is common between pixels of the image separated by a predetermined number of pixels. The method further includes modifying, based on the determining, each of the plurality of pixels of the image to exhibit integer value M-bit color depth, wherein integer value M is less than integer value N.

The method further includes determining a particular numerical value associated with a Red color component, determining a particular numerical value associated with a Green color component, and determining a particular numerical value associated with a Blue color component.

The particular threshold value is common between pixels separated by a predetermined number of adjacent pixels having a common row index value The particular threshold value is common between pixels separated by a predetermined number of adjacent pixels having a common column index value. The particular threshold value is common between pixels separated by a predetermined number of pixels having a dissimilar column index value and a dissimilar row index value. Further, the integer value N-bit color depth corresponds to integer value 24-bit color depth, and integer value M-bit color depth corresponds to integer value 16-bit color depth.

A system for dithering of an image is described. The system includes a computer process in communication with a memory device. The memory device includes a computer-readable medium having sets of instructions stored thereon, which when executed by the computer processor, cause the computer processor to analyze each of a plurality of pixels of the image, wherein each pixel of the plurality of pixels exhibits integer value N-bit color depth and determine a particular index value of each pixel of the image, a particular numerical value associated with a particular color component of each pixel of the image, and a particular threshold value associated with the particular color component of each pixel of the image. The particular threshold value is common between pixels of the image separated by a predetermined number of pixels. The sets of instructions further cause the computer processor to modify, based on the determining, each of the plurality of pixels of the image to exhibit integer value M-bit color depth, wherein integer value M is less than integer value N.

A computer-readable medium for dithering of an image is described. The computer-readable medium includes instructions for analyzing each of a plurality of pixels of the image, wherein each pixel of the plurality of pixels exhibits integer value N-bit color depth and determining a particular index value of each pixel of the image, a particular numerical value associated with a particular color component of each pixel of the image, and a particular threshold value associated with the particular color component of each pixel of the image. The particular threshold value is common between pixels of the image separated by a predetermined number of pixels. The computer-readable medium further includes instructions for modifying, based on the determining, each of the plurality of pixels of the image to exhibit integer value M-bit color depth, wherein integer value M is less than integer value N.

BRIEF DESCRIPTION OF THE DRAWINGS

A further understanding of the nature and advantages of the present invention may be realized by reference to the remaining portions of the specification, and the drawings, wherein like reference numerals are used throughout to refer to similar components. In some instances, a sub-label may be associated with a reference numeral to denote one of multiple similar components. When reference is made to a reference numeral without specification to an existing sub-label, it is intended to refer to all such multiple similar components.

FIG. 6 shows an example first, second, and third default dithering matrix.

DETAILED DESCRIPTION OF THE DISCLOSURE

The present disclosure is generally directed to systems and methods for image dithering. In particular, the present disclosure directed to an ordered dithering algorithm, and a device configured to implement the ordered dithering algorithm. In general, the ordered dithering algorithm may be considered a "smoothing" function that minimizes undesirable artifacts, such as color banding for example, which may occur when converting color resolution of a particular image from a greater color bit depth to a lesser color bit depth. Such a conversion may be preferentially implemented, for example, in scenarios where a particular device only supports display of images of a particular bit depth, or in applications where allocation of memory and processing resources are of concern, such as in handheld mobile device applications.

Although not so limited, various aspects of the present disclosure may be understood based upon the preceding and following description.

Figure 1:
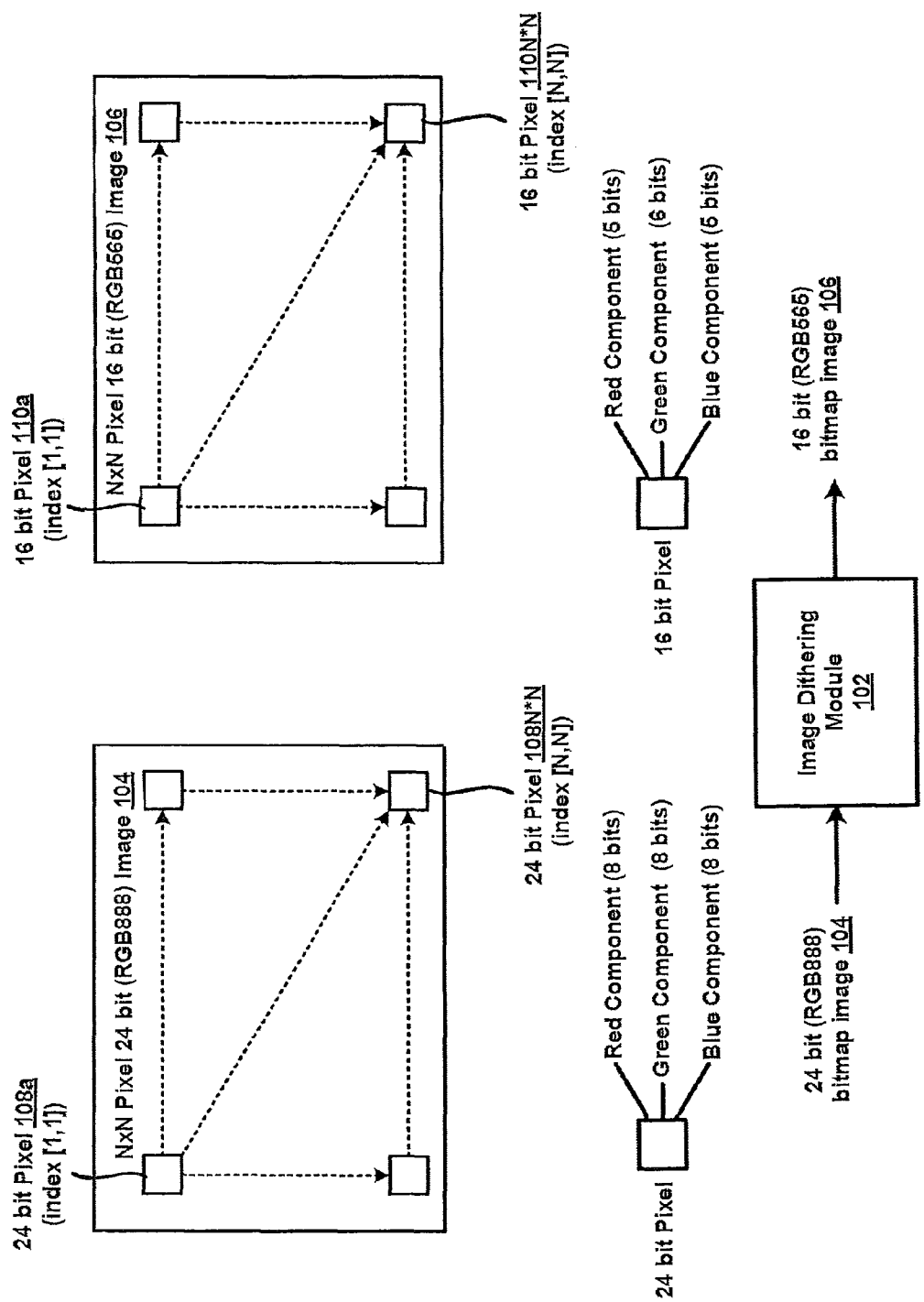
FIG. 1 shows an image dithering module in accordance with the present disclosure.

Referring now to FIG. 1, an image dithering module 102 is shown in accordance with the present disclosure. The example image dithering module 102 may be wholly or at least partially incorporated within a computing system or device at least configured to process and display images. An example of such a computing system or device is described in detail below in connection with FIG. 9. Additionally, while a 24-bit to 16-bit image color resolution conversion is discussed throughout, it is contemplated that the features of the present disclosure are applicable to any scenario in which image color resolution conversion is desired or otherwise required.

For example, as shown in FIG. 1, an N×N pixel 24-bit bitmap 104, where the variable N is a non-zero integer value, may be input into the image dithering module 102, and an N×N pixel 16-bit bitmap 106 may be output from the image dithering module 102. In this example, both the 24-bit bitmap 104 and the 16-bit bitmap 106 comprise of $N^2$ pixels, and the image dithering module 102 may be configured to operate on the 24-bit bitmap 104 on a pixel-by-pixel basis to produce the 16-bit bitmap 106. For example, a 24-bit pixel 108a, selected from a plurality of input pixels 108a-$N^2$, of the 24-bit bitmap 104 may be input into the image dithering module 102, and a 16-bit pixel 110a, selected from a plurality of output pixels 110a-$N^2$, of the 16-bit bitmap 106 may be output from the image dithering module 102. In this manner, each of the plurality of input pixels 108a-$N^2$ of the 24-bit bitmap 104 may be operated on to form or otherwise generate a corresponding one of the plurality of output pixels 110a-$N^2$.

The 16-bit pixel 110a corresponds to a reduced color resolution form or format of the 24-bit pixel 108a. In particular, the 16-bit pixel 110a includes a Red component that is represented by 5-bits, a Green component that is represented by 6-bits, and a Blue component that is represented by 5-bits. An image having such a color depth, or bit depth, form or format may be referred to as a "RGB565" image. In contrast, the 24-bit pixel 108a includes a Red component that is represented by 8-bits, a Green component that is represented by 8-bits, and a Blue component that is represented by 8-bits. Here, an image having such a color depth, or bit depth, form or format may be referred to as a "RGB888" image. Thus, in the present example, the image dithering module 102 is configured to output a "RGB565" image based on an input of a "RGB888" image. Other embodiments are possible.

Figure 2:
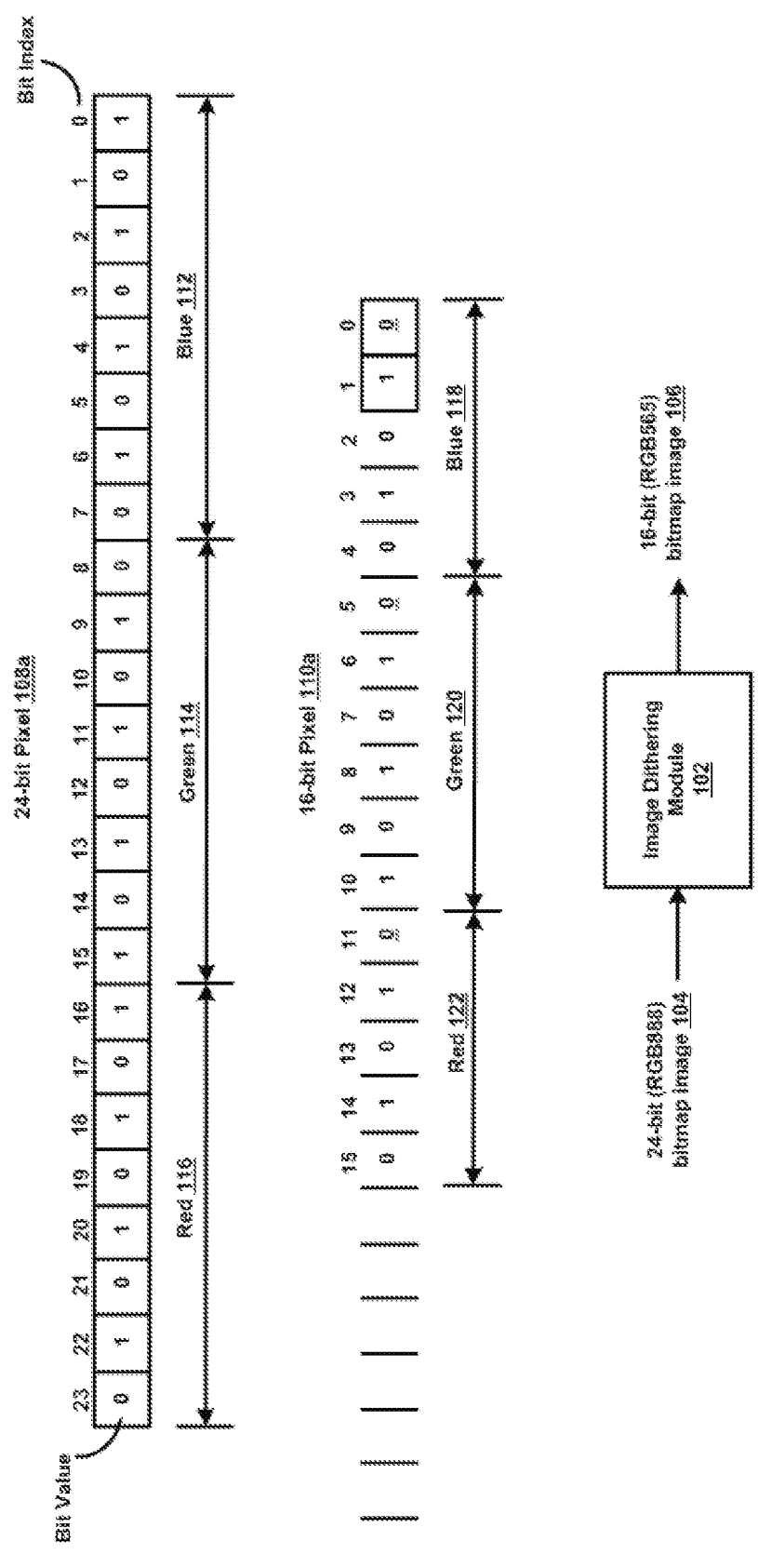
FIG. 2 shows memory allocation of a 24-bit pixel and a 16-bit pixel of FIG. 1.

Referring now to FIG. 2, memory allocation of each of the 24-bit pixel 108a and the 16-bit pixel 110a of FIG. 1 is shown. In particular, a memory allocation scheme of the 24-bit pixel 108a may include an 8-bit Blue partition 112 formed by bits 7-0, an 8-bit Green partition 114 formed by bits 15-8, and an 8-bit Red partition 116 formed by bits 23-16. In contrast, a memory allocation scheme of the 16-bit pixel 110a may include a 5-bit Blue partition 118 formed by bits 4-0, a 6-bit Green partition 120 formed by bits 10-5, and a 5-bit Red partition 122 formed by bits 15-11.

In an aspect, transformation of the 24-bit pixel 108a to the 16-bit pixel 110a may include truncating the 3 LSBs (Least Significant Bits) of the 8-bit Blue partition 112 of the 24-bit pixel 108a to form the 5-bit Blue partition 118 of the 16-bit pixel 110a, truncating the 2 LSBs of the 8-bit Green partition 114 of the 24-bit pixel 108a to form the 6-bit Green partition 120 of the 16-bit pixel 110a, and truncating the 3 LSBs of the 8-bit Red partition 116 of the 24-bit pixel 108a to form the 5-bit Red partition 122 of the 16-bit pixel 110a. Alone, however, such a procedure may introduce undesirable artifacts into the 16-bit bitmap 106, such as color banding and other effects for example blocking effect. The image dithering module 102 of the present disclosure is configured to address these and other issues which may occur when converting color resolution of a particular image from a greater color bit depth to a lesser bit depth.

For example, and as described in further detail below, the image dithering module 102 may initially truncate the above-mentioned LSBs of the 8-bit Blue partition 112, the 8-bit Green partition 114, and the 8-bit Red partition 116, respectively, of the 24-bit pixel 108a, and then populate the 5-bit Blue partition 118, the 6-bit Green partition 120, and the 5-bit Red partition 122 of the 16-bit pixel 110a with remaining, corresponding, non-truncated bits. The image dithering module 102 may then modify (or not) the 5-bit Blue partition 118, the 6-bit Green partition 120, and the 5-bit Red partition 122 based on an analysis of the truncated bits of the 8-bit Blue partition 112, the 8-bit Green partition 114, and the 8-bit Red partition 116, respectively. This modification of the 5-bit Blue partition 118, the 6-bit Green partition 120, and the 5-bit Red partition 122 is illustrated in FIG. 2 by an underlining of bit 0 of the 5-bit Blue partition 118, an underlining of bit 5 of the 6-bit Green partition 120, and an underlining of bit 11 of the 5-bit Red partition 122. Such an implementation may be referred to as "pixel dithering" in accordance with the present disclosure, because the dithering of a particular image (e.g., 24-bit bitmap 104) is performed on a pixel-by-pixel, and component-by-component, basis.

Figure 3:
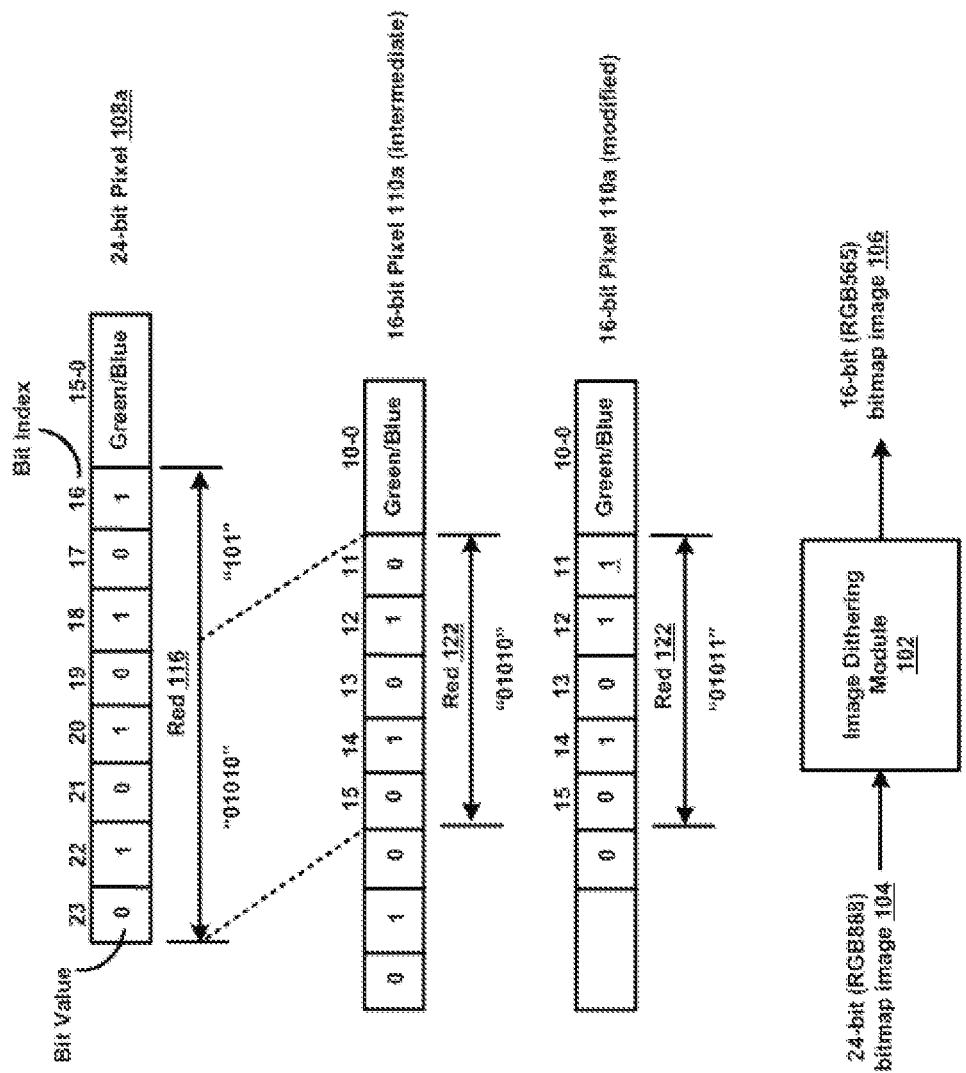
FIG. 3 shows modification of a Red component of the 16-bit pixel of FIG. 2.

For example, referring now to FIG. 3, modification of the 5-bit Red partition 122 of the 16-bit pixel 110a of FIG. 2 is shown in accordance with the present disclosure. In particular, the image dithering module 102 may truncate bits 18-16 of the 8-bit Red partition 116, and then populate bits 15-11 of the 5-bit Red partition 122 with remaining respective bits (e.g., "01010"). The image dithering module 102 may additionally determine that bits 18-16 of the 8-bit Red partition 116 form a first sequence "101," and that bits 23-19 of the 8-bit Red partition 116 form a second sequence "01010." In base 10 notation, "101" corresponds to integer value 5, and "01010" corresponds to integer value 10. The image dithering module 102 may then compare the first sequence "101" to a predetermined integer threshold value (e.g., integer value 0 or "000"). In one example, when the first sequence "101" is of an integer value at least greater than predetermined integer threshold value, the image dithering module 102 may increment the second sequence "01010" by integer value 1 to "01011" (e.g., as shown in FIG. 3). In base 10 notation, "01011" corresponds to integer value 11. Otherwise, the image dithering module 102 may hold the second sequence "01010" unchanged in value. Other embodiments are possible.

In general, a same or similar procedure may be performed in modification (or not) of the 6-bit Green partition 120 and the 5-bit Blue partition 118 of the 16-bit pixel of FIG. 2. In particular, and as mentioned above, the image dithering module 102 may be configured to operate on the 24-bit bitmap 104 on a pixel-by-pixel, and component-by-component, basis to produce the 16-bit bitmap 106. For example, referring now to FIG. 4, the image dithering image dithering module 102 of FIG. 1 is shown in detail. For brevity, the example image dithering module 102 is depicted in a simplified and conceptual form, and may generally include more or fewer image processing-related components and/or modules as desired.

Further, number and type of features or elements incorporated within the image dithering module 102 may or may not be implementation-specific.

The image dithering module 102 may include a pixel data module 124, a threshold data module 126, and a pixel dithering module 128. In practice, the pixel data module 124 may be configured to receive the 24-bit bitmap 104, and process or otherwise operate on the 24-bit bitmap 104 on a pixel-by-pixel basis. Information associated with each and every pixel of the 24-bit bitmap 104 is extracted and/or used by the image dithering module 102 to generate a corresponding pixel of the 16-bit bitmap 106. However, for brevity, processing of the 24-bit pixel 108a to produce or generate the 16-bit pixel 110a is described herein.

For example, the pixel data module 124 may extract a RGB (Red/Green/Blue) bit representation of the 24-bit pixel 108a (e.g., as shown in FIG. 2), and pass the RGB bit representation to the pixel dithering module 128 for further processing, discussed further below. The pixel data module 124 may additionally extract an index value associated with the 24-bit pixel 108a, and pass the index value to the threshold data module 126, and the pixel dithering module 128, for further processing. For example, the pixel data module 124 may extract an index value of "[1,1]" that is associated with the 24-bit pixel 108a. Here, the index value [1,1] may indicate that the 24-bit pixel 108a is located at column 1, row 1, of the 24-bit bitmap 104, such as shown in FIG. 1.

The threshold data module 126 may be configured to receive the index value [1,1] associated with the 24-bit pixel 108a, and identify a predetermined integer threshold value that is associated with the particular index value [1,1]. For example, the threshold data module 126 may determine that integer value 0, corresponding to the predetermined integer threshold value, is associated with the 24-bit pixel 108a as found at index value [1,1] of the 24-bit bitmap 104. The threshold data module 126 may then pass the identified predetermined integer threshold value to the pixel dithering module 128 for further processing.

In particular, the pixel dithering module 128 may be configured to receive, from the threshold data module 126, the predetermined integer threshold value 0, and may further be configured to receive, from the pixel data module 124, the index value of [1,1] associated with the 24-bit pixel 108a along with the RGB bit representation of the 24-bit pixel 108a. The pixel dithering module 128 may still further be configured to generate, based on information received from the pixel data module 124 and the threshold data module 126, the 16-bit pixel 110a in accordance with "pixel dithering" of the present disclosure.

For example, the pixel dithering module 128 may analyze the RGB bit representation of the 24-bit pixel 108a, truncate respective LSBs of the 8-bit Blue partition 112, the 8-bit Green partition 114, and the 8-bit Red partition 116 of the 24-bit pixel 108a, and then populate the 5-bit Blue partition 118, the 6-bit Green partition 120, and the 5-bit Red partition 122, with remaining respective bits. Such an operation may be understood in view of FIG. 2, where bits 4-0 of the 5-bit Blue partition 118 are populated with corresponding bits "01010" of the 8-bit Blue partition 112, bits 10-5 of the 6-bit Green partition 120 are populated with corresponding bits "101010" of the 8-bit Green partition 114, and bits 15-11 of the 5-bit Red partition 122 are populated with corresponding bits "01010" of the 8-bit Red partition 116. The pixel dithering module 128 may then modify (or not) the 5-bit Blue partition 118, the 6-bit Green partition 120, and the 5-bit Red partition 122, independent of each other, based on an analysis of truncated LSBs of the 8-bit Blue partition 112, the 8-bit Green partition 114, and the 8-bit Red partition 116.

For example, the pixel dithering module 128 may determine that bits 18-16 of the 8-bit Red partition 116 form a first sequence "101," and that bits 23-19 of the 8-bit Red partition 116 form a second sequence "01010," such as shown in FIG. 3 and described above. The pixel dithering module 128 may then compare the first sequence "101" to the predetermined integer threshold value 0, and increment the second sequence "01010" by integer value 1 to "01011," since the sequence "101" is at least greater than the predetermined integer threshold value 0. The pixel dithering module 128 may then store the sequence "01011" to the 5-bit Red partition 122 of the 16-bit pixel 110a, and process remaining color components of the 24-bit pixel 108a, accordingly. In general, such a process may be performed sequentially or in parallel.

Figure 4:
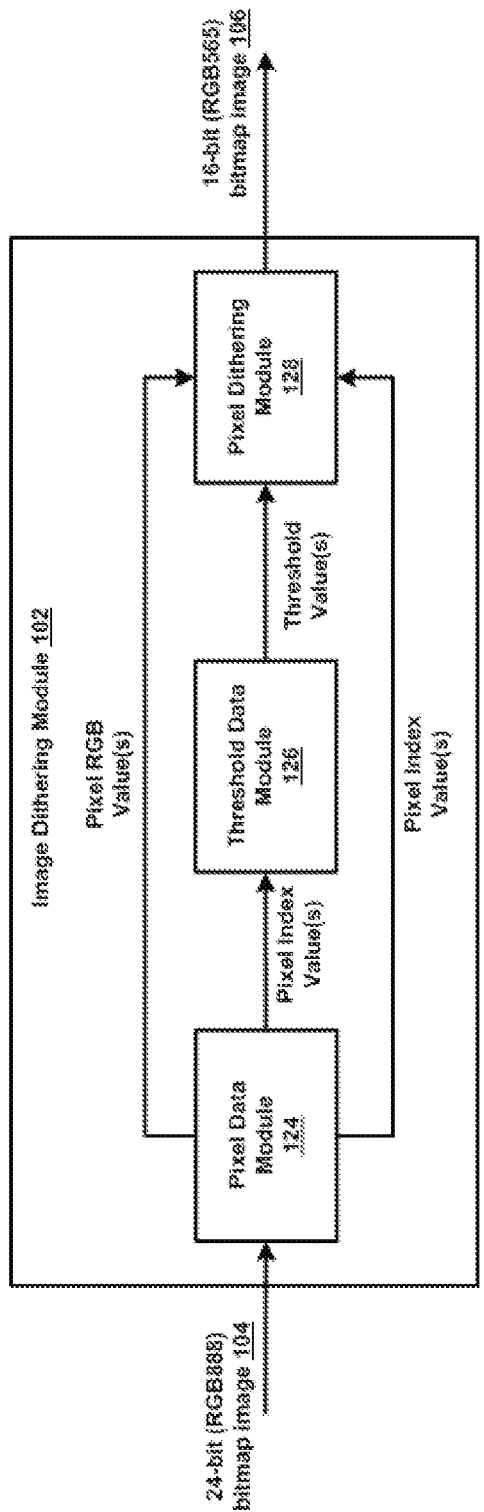
FIG. 4 shows the image dithering module of FIG. 1 in detail.
Figure 5:
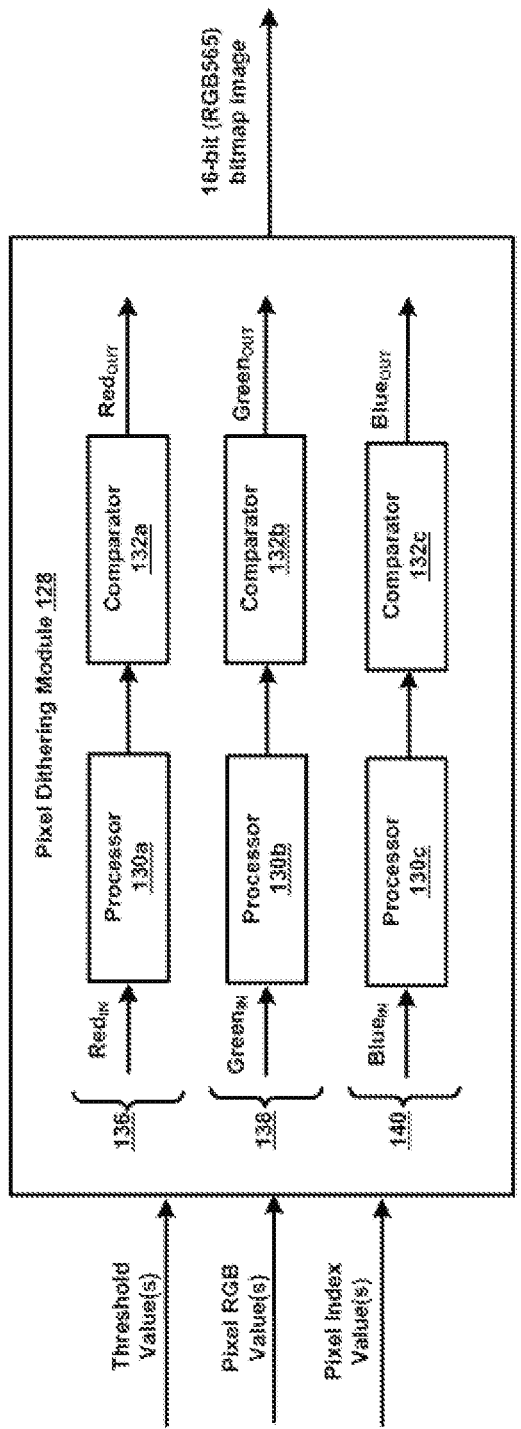
FIG. 5 shows a pixel dithering module of FIG. 4 in detail.

For example, referring now to FIG. 5, the pixel dithering module 128 of FIG. 4 is shown in detail. For brevity, the example pixel dithering module 128 is depicted in a simplified and conceptual form, and may generally include more or fewer image processing-related components and/or modules as desired. Further, number and type of features or elements incorporated within the pixel dithering module 128 may or may not be implementation-specific.

The pixel dithering module 128 may include a plurality of processors 130a-c and a plurality of comparators 132a-c. The processor 130a together with the comparator 132a form a red pixel component signal processing path 136. The processor 130b together with the comparator 132b form a green pixel component signal processing path 138. The processor 130c together with the comparator 132c form a blue pixel component signal processing path 140. In general, the pixel dithering module 128 may be configured to receive, from the threshold data module 126, a predetermined integer threshold value associated with each one of the plurality of input pixels 108a-$N^2$ of the 24-bit bitmap 104, and may further be configured to receive, from the pixel data module 124, an index value and an RGB bit representation associated with each one of the plurality of input pixels 108a-$N^2$ of the 24-bit bitmap 104. In this manner, the pixel dithering module 128 (in combination with the pixel data module 124 and the threshold data module 126) may process each color component of each of the plurality of input pixels 108a-$N^2$ of the 24-bit bitmap 104 to form a corresponding one of each of the plurality of output pixels 110a-$N^2$ of the 16-bit bitmap 106.

For example, processing of a red pixel component associated with each one of the plurality of input pixels 108a-$N^2$ of the 24-bit bitmap 104 may be performed along the red pixel component signal processing path 136. An example of processing a red pixel component of a particular 24-bit input pixel (i.e., 24-bit pixel 108a) to form or otherwise generate a red pixel component of a particular 16-bit output pixel (i.e., 16-bit pixel 110a) is described above in connection with FIGS. 1-4, where a "compare" function may be performed or otherwise implemented by the comparator 132a, and other functions may be performed or otherwise implemented by the processor 130a. In a same or similar manner, processing of a green pixel component associated with each one of the plurality of input pixels 108a-$N^2$ of the 24-bit bitmap 104 may be performed along the green pixel component signal processing path 138, and processing of a blue pixel component associated with each one of the plurality of input pixels 108a-$N^2$ of the 24-bit bitmap 104 may be performed along the blue pixel component signal processing path 140.

Upon completion of processing of each color component of each of the plurality of input pixels 108a-$N^2$ of the 24-bit bitmap 104 to form a corresponding one of each of the plurality of output pixels 110a-$N^2$ of the 16-bit bitmap 106, the pixel dithering module 128 may assemble each of the plurality of output pixels 110a-$N^2$ to form the 16-bit bitmap 106 based on an index value (e.g., index value [1,1]) of a corresponding one of the of the plurality of input pixels 108a-$N^2$.

Figure 6:
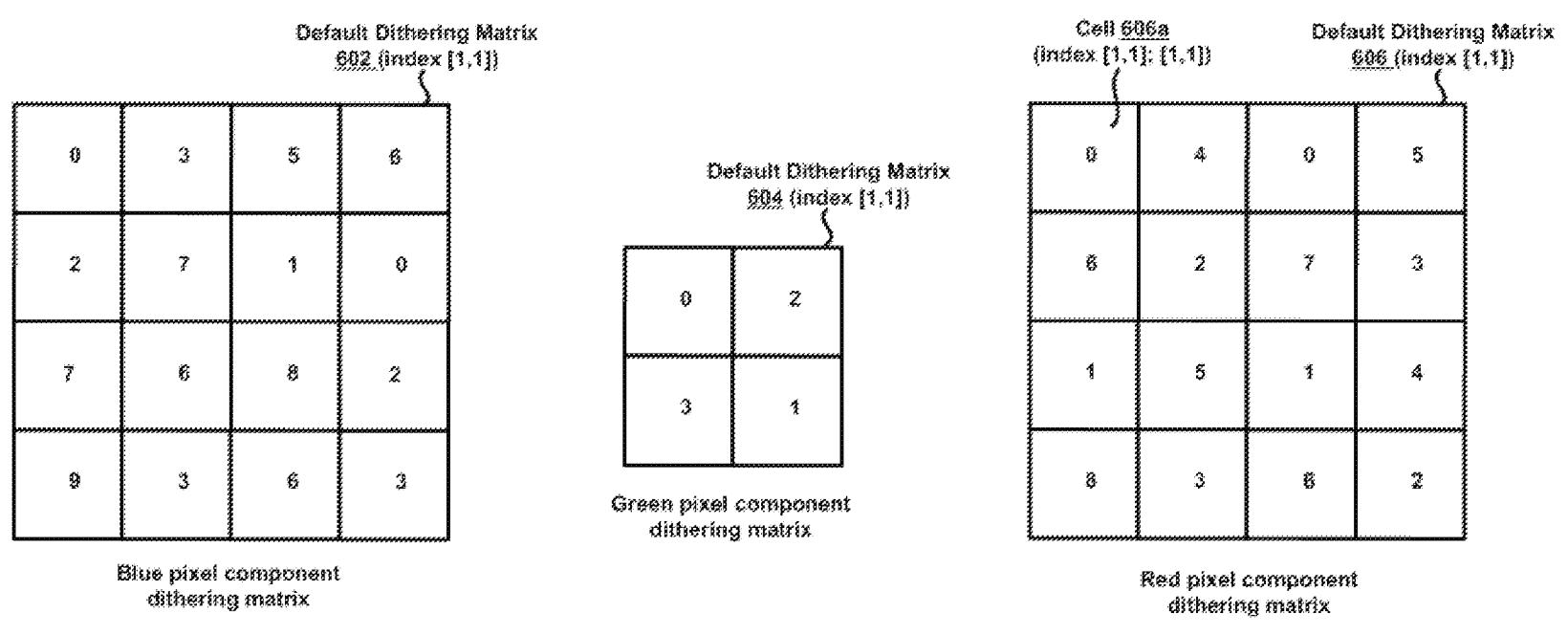

Referring now to FIG. 6, a first default dithering matrix 602, a second default dithering matrix 604, and a third default dithering matrix 606 are shown in accordance with the present disclosure. In general, the first default dithering matrix 602, second default dithering matrix 604, and third default dithering matrix 606 may be generated by the image dithering module 102 as part of the "pixel dithering" implementation of the present disclosure. In particular, the first default dithering matrix 602 may be incorporated as part of blue pixel component signal processing as implemented by the image dithering module 102, the second default dithering matrix 604 may be incorporated as part of green pixel component signal processing as implemented by the image dithering module 102, and the third default dithering matrix 606 may be incorporated as part of red pixel component signal processing as implemented by the image dithering module 102. However, other embodiments are possible. In particular, form or format of the first default dithering matrix 602, second default dithering matrix 604, and third default dithering matrix 606 are provided for explanation purposes only, and variations are possible.

The first default dithering matrix 602, second default dithering matrix 604, and third default dithering matrix 606 each comprise of an M×M array of integer values, where the variable M is a non-zero integer value, and is less than or equal to the variable N discussed above. In the example of FIG. 6, the first default dithering matrix 602 and the third default dithering matrix 606 are each a 4×4 array of integer values, and the second default dithering matrix 604 is a 2×2 array of integer values. Other embodiments are possible.

The respective integer values of the first default dithering matrix 602, second default dithering matrix 604, and third default dithering matrix 606 correspond to particular predetermined integer threshold values, such as the predetermined integer threshold value 0 discussed above. Further, the respective integer values of the first default dithering matrix 602, second default dithering matrix 604, and third default dithering matrix 606 are arbitrary, and may be defined based upon some form of a random number generator. For example, an integer value 0 at a cell 606a of the third default dithering matrix 606, identified by an index value of "[1,1]; [1,1]," may be a randomly generated number that is populated to cell 606a by the image dithering module 102. Here, the index value [1,1];[1,1] may indicate that the cell 606a is located at column 1, row 1, of the third default dithering matrix 606, where the third default dithering matrix 606 is itself assigned an index value [1,1]. Such an implementation may enable the image dithering module 102 to match a particular predetermined integer threshold value to a particular pixel (and corresponding color component) of the 24-bit bitmap 104, such as matching the predetermined integer threshold value 0 to the 24-bit pixel 108a as discussed above.

Figure 7:
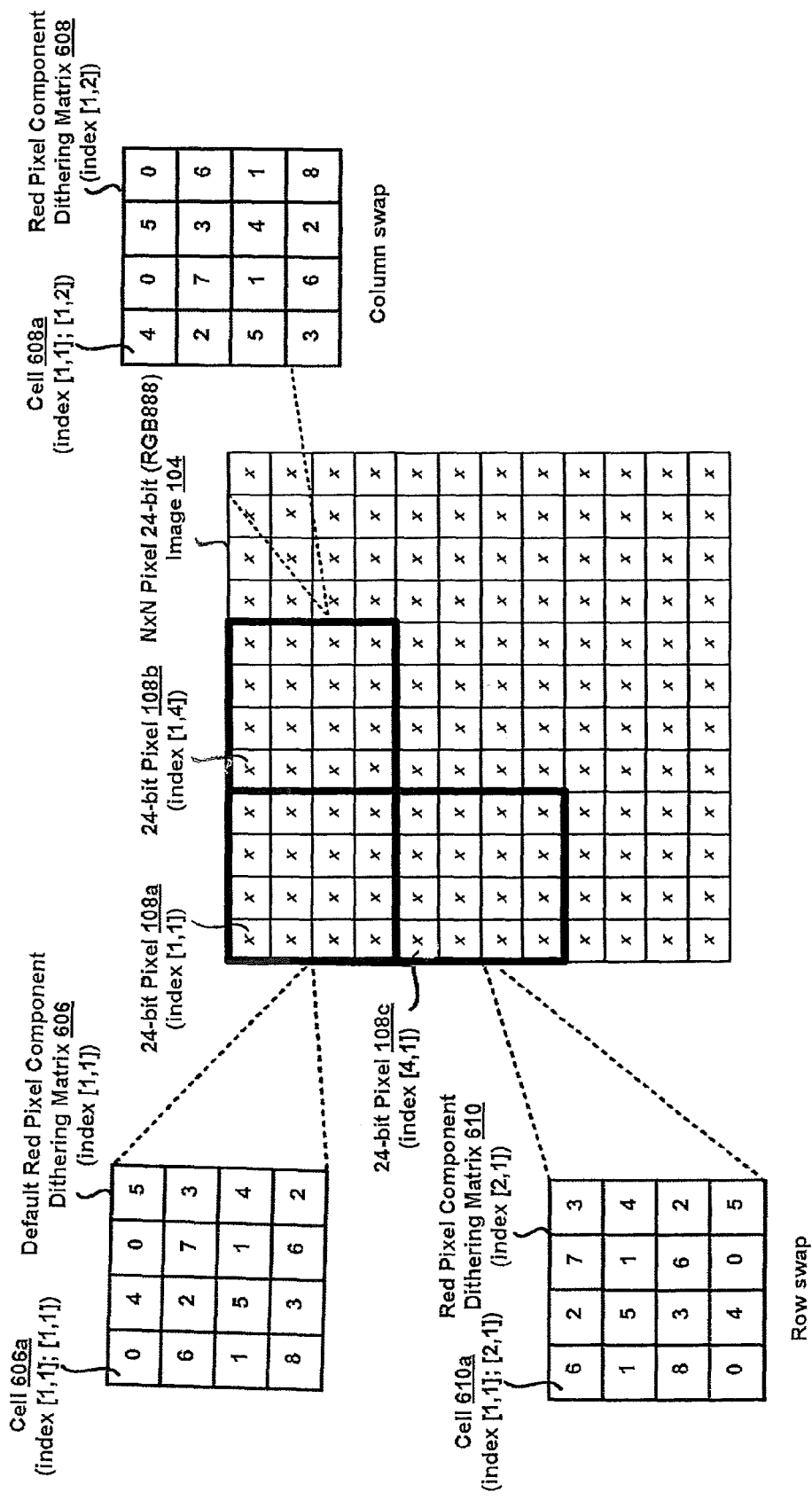
FIG. 7 shows the third default dithering matrix of FIG. 6, in relation to a 24-bit bitmap of FIG. 1.

For example, referring now to FIG. 7, the third default dithering matrix 606 is shown in relation to the 24-bit bitmap 104 of FIG. 1. As mentioned above, the third default dithering matrix 606 may be incorporated as part of red pixel component signal processing as implemented by the image dithering module 102. In a same or similar manner to the following discussion, the first default dithering matrix 602 and the second default dithering matrix 604 may each be shown in relation to the 24-bit bitmap 104 of FIG. 1, and incorporated as part of blue pixel component signal processing and green pixel component signal processing, respectively, as implemented by the image dithering module 102.

As shown in FIG. 7, the third default dithering matrix 606 may be arranged to overlay a portion of the 24-bit bitmap 104 of FIG. 1, such as to illustrate how the image dithering module 102 may match the predetermined integer threshold value 0 to the 24-bit pixel 108a of the 24-bit bitmap 104 as discussed above. A same or similar "matching" may be realized between other predetermined integer threshold values of the third default dithering matrix 606 and corresponding pixels of the 24-bit bitmap 104.

In accordance with the "pixel dithering" algorithm of the present disclosure, the third default dithering matrix 606 may be modified by row and/or column transformation such that a matching may be realized between particular predetermined integer threshold values and particular pixels of the 24-bit bitmap 104 that are not "overlaid" by the third default dithering matrix 606. For example, a column transformation of the third default dithering matrix 606 in a row direction with respect to the 24-bit bitmap 104 may be implemented to generate a first modified dithering matrix 608.

In this example, an integer threshold value 4 at a cell 608a of the first modified dithering matrix 608, identified by an index value of "[1,1]; [1,2]," may be populated to cell 608a by the image dithering module 102 based on column transformation of the third default dithering matrix 606. Here, the index value [1,1];[1,2] may indicate that the cell 608a is located at column 1, row 1, of the first modified dithering matrix 608, where the first modified dithering matrix 608 is itself assigned an index value [1,2] based on its position or orientation with respect to the third default dithering matrix 606. The integer threshold value 4 at the cell 608a of the first modified dithering matrix 608 may subsequently be matched to a 24-bit pixel 108b of the 24-bit bitmap 104 such that red pixel component signal processing of the 24-bit pixel 108b may be performed in a same or similar manner as that discussed above in connection with the 24-bit pixel 108a. Additionally, as may be understood based upon the value of the variable M (e.g., 4) of the third default dithering matrix 606, a modified dithering matrix having an index of [1,5] (not shown) may be substantially similar to the third default dithering matrix 606, based on an inherent periodicity introduced by column transformation of the third default dithering matrix 606.

In a same or similar manner to column transformation of the third default dithering matrix 606, a row transformation of the third default dithering matrix 606 may be implemented to generate a second modified dithering matrix 610. In this example, an integer threshold value 6 at a cell 610a of the second modified dithering matrix 610, identified by an index value of "[1,1]; [2,1]," may be populated to the cell 610a by the image dithering module 102. Here, the index value [1,1]; [2,1] may indicate that the cell 610a is located at column 1, row 1, of the second modified dithering matrix 610, where the second modified dithering matrix 610 is itself assigned an index value [2,1] based on its position with respect to the third default dithering matrix 606.

The integer threshold value 6 at the cell 610a of the second modified dithering matrix 610 may subsequently be matched to a 24-bit pixel 108c of the 24-bit bitmap 104 such that red pixel component signal processing of the 24-bit pixel 108c may be performed in a same or similar manner as that discussed above in connection with the 24-bit pixel 108a. Additionally, as may be understood based upon the value of the variable M of the third default dithering matrix 606, a modified dithering matrix having an index of [5,1] (not shown) may be substantially similar to the third default dithering matrix 606, based on an inherent periodicity introduced by row transformation of the third default dithering matrix 606.

Although not shown in FIG. 7, a combination of row/column transformation of the third default dithering matrix 606 may be implemented in instances where an index value of a corresponding modified dithering matrix is not along only a column or row direction with respect to the 24-bit bitmap 104. For example, a modified version of the third default dithering matrix 606 having an index [2,2] may be subject to both a column transformation, as shown by the first modified dithering matrix 608, and a row transformation, as shown by the second modified dithering matrix 610. In general, order of transformation operation(s) may be predefined such that in some instances column transformation may be implemented before or prior to row transformation, and vice versa.

Figure 8:
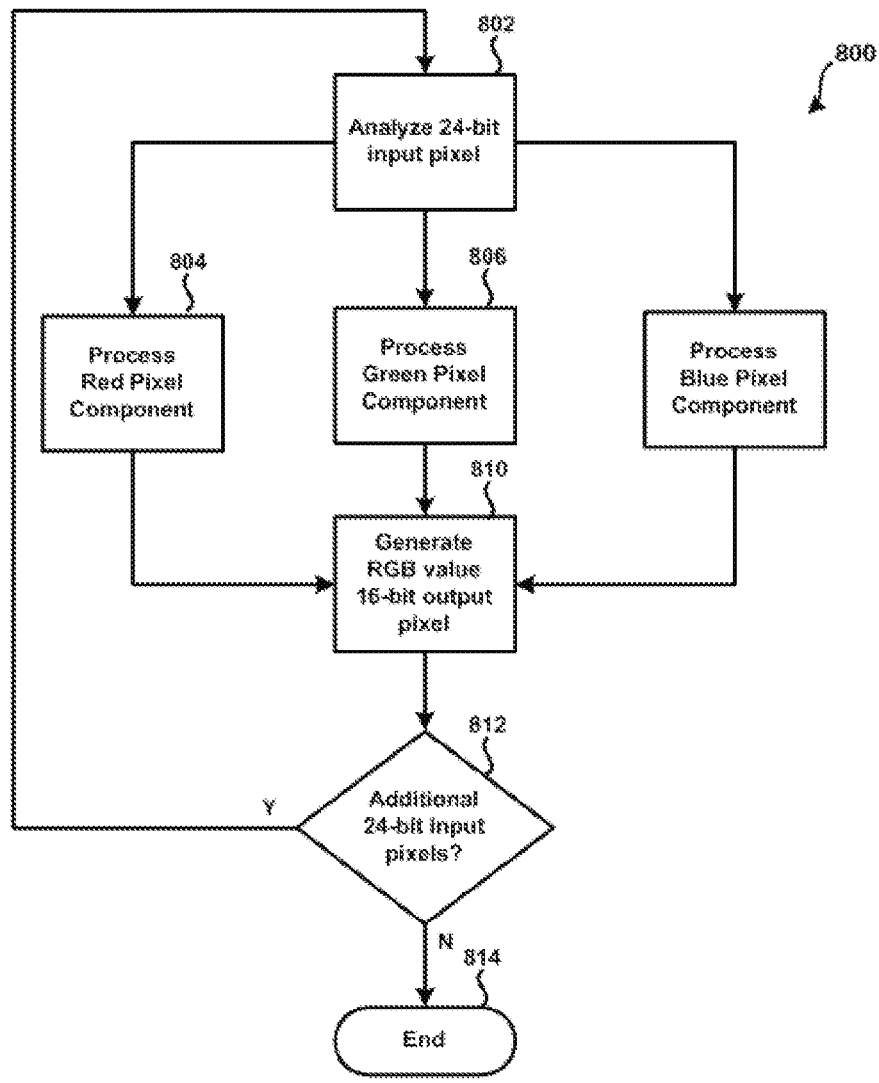
FIG. 8 shows a method for ordered dithering of an image in accordance with the present disclosure.

Referring now to FIG. 8, an example method 800 for ordered dithering of an image is shown in accordance with the present disclosure. In general, the example method 800 may be implemented by the image dithering module 102 discussed above in connection with FIGS. 1-7. The image dithering module 102 itself may be wholly or at least partially implemented by a special-purpose computing system or device, which itself may, in some embodiments, be configured based on implementation-specific requirements or specifications.

At operation 802, the image dithering module 102 may analyze the 24-bit pixel 108a of the 24-bit bitmap 104 to determine or identify that index value of [1,1] is associated with the 24-bit pixel 108a, and to identify the RGB bit representation of the 24-bit pixel 108a. The image dithering module 102 may further associate the predetermined integer threshold value 0 with the index value of [1,1] that is associated with the 24-bit pixel 108a.

At operations 804, 806, and 808, the image dithering module 102 may implement color-component-specific "pixel dithering" in accordance with the present disclosure. An example of processing a red pixel component of the 24-bit pixel 108a is described above in connection with FIGS. 1-7. In a same or similar manner, the image dithering module 102 may process a green pixel component and a blue pixel component, of the 24-bit pixel 108a. The processing of particular color components may differ slightly based on size of a corresponding dithering matrix.

At operation 810, the image dithering module 102 may generate a 16-bit RGB bit representation of the 24-bit pixel 108a that is associated with the 16-bit pixel 110a. Next, at operation 812, the image dithering module 102 may determine that other respective 24-bit pixels of the 24-bit bitmap 104 require processing similar to the 24-bit pixel 108a. The example method 800 may continue in a loop between operations 802 and 814 until a final or last 24-bit pixel of the 24-bit bitmap 104 is processed. For example, following processing of the 24-bit pixel $108N^2$ of the 24-bit bitmap 104, process flow may proceed to operation 812, corresponding to termination of the example method 800.

The example method 800 may be beneficial in many respects. For example, the method 800 may be considered to be an "improved" ordered dithering algorithm. In particular, dithering matrices of the present disclosure are expanded to, in some implementations, 4×4 matrices to enable an "easy" hardware implementation. Additionally, the dithering matrices do not remain unchanged, and instead original or default matrices are transformed based on position information of currently processed pixels, such as row transformation, column transformation, transposed transformation, etc. Accordingly, defects such as small square, stripe, and brightness distortion that result from existing ordered dithering techniques may be overcome. Additionally, adjacent pixel information is not required thereby reducing computational complexity and system memory requirements. Such an implementation may be particularly beneficial in handheld mobile device applications. Other advantages and benefits may be understood in light of the above-description in reference to FIGS. 1-7.

Figure 9:
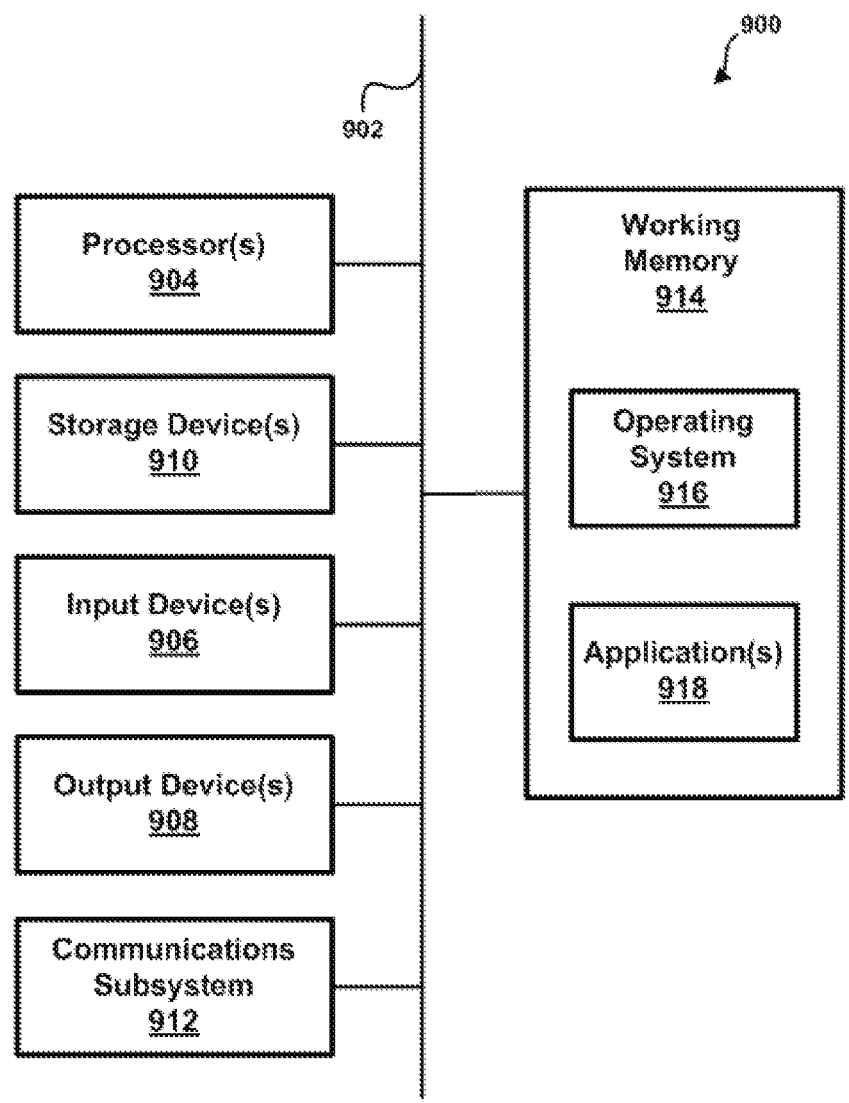
FIG. 9 shows an example computing system or device.

FIG. 9 illustrates an embodiment of an example computer system/device 900. An example of a computer system or device includes a multi-mode mobile user equipment or terminal, a server computer, desktop computer, laptop computer, personal data assistant, gaming console, and others. The example computer device 900 may be configured to perform and/or include instructions that, when executed, cause the computer system 900 to perform the example method of FIG. 8. FIG. 9 is intended only to provide a generalized illustration of various components, any or all of which may be utilized as appropriate. FIG. 9, therefore, broadly illustrates how individual system elements may be implemented in a relatively separated or relatively more integrated manner.

The computer device 900 is shown comprising hardware elements that can be electrically coupled via a bus 902 (or may otherwise be in communication, as appropriate). The hardware elements may include a processing unit with one or more processors 904, including without limitation one or more general-purpose processors and/or one or more special-purpose processors (such as digital signal processing chips, graphics acceleration processors, and/or the like); one or more input devices 906, which can include without limitation a remote control, a mouse, a keyboard, and/or the like; and one or more output devices 908, which can include without limitation a presentation device (e.g., television), a display, a printer, and/or the like. Type of the one or more output devices 908 may be specific to a type of the computer system or device 900. For example, a display of the device 900 may be different in the example of a handheld mobile terminal, when compared to a display of the system 900 in the example of a personal computer.

The computer system 900 may further include (and/or be in communication with) one or more non-transitory storage devices 910, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer device 900 might also include a communications subsystem 912, which can include without limitation a modem, a network card (wireless or wired), an infrared communication device, a wireless communication device, and/or a chipset (such as a Bluetooth™ device, an 902.11 device, a WiFi device, a WiMax device, cellular communication facilities (e.g., GSM, WCDMA, LTE, etc.), and/or the like. The communications subsystem 912 may permit data to be exchanged with a network (such as the network described below, to name one example), other computer systems, and/or any other devices described herein. In many embodiments, the computer system 900 may further comprise a working memory 914, which can include a RAM or ROM device, as described above.

The computer device 900 may also comprise software elements, shown as being currently located within the working memory 914, including an operating system 916, device drivers, executable libraries, and/or other code, such as one or more application programs 918, which may comprise computer programs provided by various embodiments, and/or may be designed to implement methods, and/or configure systems, provided by other embodiments, as described herein. Merely by way of example, one or more procedures described with respect to the method(s) discussed above, and/or system components might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 910 described above. In some cases, the storage medium may be incorporated within a computer system, such as computer system 900. In other embodiments, the storage medium might be separate from a computer system (e.g., a removable medium, such as flash memory), and/or provided in an installation package, such that the storage medium can be used to program, configure, and/or adapt a general purpose computer with the instructions/code stored thereon. These instructions might take the form of executable code, which is executable by the computer device 900 and/or might take the form of source and/or installable code, which, upon compilation and/or installation on the computer system 900 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer device 900) to perform methods in accordance with various embodiments of the invention. According to a set of embodiments, some or all of the procedures of such methods are performed by the computer system 900 in response to processor 904 executing one or more sequences of one or more instructions (which might be incorporated into the operating system 916 and/or other code, such as an application program 918) contained in the working memory 914. Such instructions may be read into the working memory 914 from another computer-readable medium, such as one or more of the storage device(s) 910. Merely by way of example, execution of the sequences of instructions contained in the working memory 914 might cause the processor(s) 904 to perform one or more procedures of the methods described herein.

The terms "machine-readable medium" and "computer-readable medium," as used herein, refer to any medium that participates in providing data that causes a machine to operate in a specific fashion. In an embodiment implemented using the computer device 900, various computer-readable media might be involved in providing instructions/code to processor(s) 904 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 910. Volatile media include, without limitation, dynamic memory, such as the working memory 914.

Common forms of physical and/or tangible computer-readable media include, for example, a floppy disk, a flexible disk, hard disk, magnetic tape, or any other magnetic medium, a CD-ROM, any other optical medium, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 904 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 900.

The communications subsystem 912 (and/or components thereof) generally will receive signals, and the bus 902 then might carry the signals (and/or the data, instructions, etc. carried by the signals) to the working memory 914, from which the processor(s) 904 retrieves and executes the instructions. The instructions received by the working memory 914 may optionally be stored on a non-transitory storage device 910 either before or after execution by the processor(s) 904.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example embodiments described herein may be implemented as logical operations in a computing device in a networked computing system environment. The logical operations may be implemented as any combination of: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of dithering of an image, the image comprising a plurality of pixels arranged in an X by Y array, X and Y being integers, and the plurality of pixels exhibiting integer value N bit color depth, the method comprising:
    acquiring the image and storing it within a memory of a computing system;
    determining a numerical value associated with a particular color component of each pixel of the image;
    determining a threshold value associated with the particular color component of each pixel of the image;
    modifying each of the plurality of pixels of the image to generate a modified image comprising a plurality of pixels exhibiting integer value M-bit color depth, based on the numerical value associated with the particular color component of each pixel of the image and the threshold value associated with the particular color component of each pixel of the image; and
    storing the modified image in the memory;
    wherein the integer value M is less than integer value N;
    wherein the determining the threshold value comprises:
        providing a default dithering matrix, the default dithering matrix being an A by A array, with A being an integer greater than 0 and less than X and less than Y, wherein each element of the default dithering matrix is an integer value;
        generating a whole image dithering array based on the default dithering matrix, the whole image dithering array being an X by Y array, and each element of the whole image dithering array corresponding to one of the plurality of pixels of the image;
        for each pixel of the plurality of pixels, selecting the corresponding element of the whole image dithering array as the threshold value associated with the pixel
    wherein the generating a whole image dithering array comprises:
        dividing the plurality of pixels into a plurality of pixel groups, each of the plurality of pixel groups comprising an A by A group of pixels;
        associating the default dithering matrix with a first pixel group of the plurality of pixel groups;
        associating a modified dithering matrix to a second pixel group adjacent to the first pixel group, wherein the modified dithering matrix is a transformation of the default dithering matrix.

2. The method of claim 1, further comprising determining a particular numerical value associated with a Red color component.

3. The method of claim 1, further comprising determining a particular numerical value associated with a Green color component.

4. The method of claim 1, further comprising determining a particular numerical value associated with a Blue color component.

5. The method of claim 1, wherein the transformation is a row swap.

6. The method of claim 1, wherein the transformation is a column swap.

7. The method of claim 1, wherein a plurality of modified dithering matrices are associated with the plurality of pixel groups in one to one correspondence; and
    each modified dithering matrix of the plurality of modified dithering matrices is a transformation of adjacent modified dithering matrices.

8. The method of claim 7, wherein transformation of the plurality of modified dithering matrices is cyclical such that every $A^{th}$ modified dithering matrix in a horizontal or vertical direction is identical.

9. A system for dithering of an image, the image comprising a plurality of pixels arranged in an X by Y array, X and Y being integers, and the plurality of pixels exhibiting integer value N bit color depth, the system comprising:
    a computer processor; and
    a memory device in communication with the computer processor, wherein the memory device includes a computer-readable medium having sets of instructions stored thereon, which when executed by the computer processor, cause the computer processor to perform:
        acquiring the image and storing it within the memory device;
        determining a numerical value associated with a particular color component of each pixel of the image;
        determining a threshold value associated with the particular color component of each pixel of the image;
        modifying each of the plurality of pixels of the image to generate a modified image comprising a plurality of pixels exhibiting integer value M-bit color depth, based on the numerical value associated with the particular color component of each pixel of the image and the threshold value associated with the particular color component of each pixel of the image; and
        storing the modified image in the memory device;
    wherein the integer value M is less than integer value N;
    wherein the determining the threshold value comprises:
        providing a default dithering matrix, the default dithering matrix being an A by A array, with A being an integer greater than 0 and less than X and less than Y, wherein each element of the default dithering matrix is an integer value;
        generating a whole image dithering array based on the default dithering matrix, the whole image dithering array being an X by Y array, and each element of the whole image dithering array corresponding to one of the plurality of pixels of the image;
        for each pixel of the plurality of pixels, selecting the corresponding element of the whole image dithering array as the threshold value associated with the pixel
    wherein the generating a whole image dithering array comprises:
        dividing the plurality of pixels into a plurality of pixel groups, each of the plurality of pixel groups comprising an A by A group of pixels;
        associating the default dithering matrix with a first pixel group of the plurality of pixel groups;
        a modified dithering matrix to a second pixel group adjacent to the first pixel group, wherein the modified dithering matrix is a transformation of the default dithering matrix.

10. The system of claim 9, wherein the sets of instructions when further executed by the computer processor, cause the computer processor to determine a particular numerical value associated with a Red color component.

11. The system of claim 9, wherein the sets of instructions when further executed by the computer processor, cause the computer processor to determine a particular numerical value associated with a Green color component.

12. The system of claim 9, wherein the sets of instructions when further executed by the computer processor, cause the computer processor to determine a particular numerical value associated with a Blue color component.

13. The system of claim 9, wherein the transformation is a row swap.

14. The system of claim 9, wherein the transformation is a column swap.

15. The system of claim 9, wherein a plurality of modified dithering matrices are associated with the plurality of pixel groups in one to one correspondence; and
each modified dithering matrix of the plurality of modified dithering matrices is a transformation of adjacent modified dithering matrices.

16. The system of claim 15, wherein transformation of the plurality of modified dithering matrices is cyclical such that every $A^{th}$ modified dithering matrix in a horizontal or vertical direction is identical.

17. A non-transitory computer-readable medium for dithering of an image comprising a plurality of pixels arranged in an X by Y array, X and Y being integers, and the plurality of pixels exhibiting integer value N bit color depth, the non-transitory computer-readable medium having instructions stored thereon, which, when executed by a computer, cause the computer to perform:
acquiring the image and storing it within a memory;
determining a numerical value associated with a particular color component of each pixel of the image;
determining a threshold value associated with the particular color component of each pixel of the image;
modifying each of the plurality of pixels of the image to generate a modified image comprising a plurality of pixels exhibiting integer value M-bit color depth, based on the numerical value associated with the particular color component of each pixel of the image and the threshold value associated with the particular color component of each pixel of the image; and
storing the modified image in the memory;
wherein the integer value M is less than integer value N;
wherein the determining the threshold value comprises:
providing a default dithering matrix, the default dithering matrix being an A by A array, with A being an integer greater than 0 and less than X and less than Y, wherein each element of the default dithering matrix is an integer value;
generating a whole image dithering array based on the default dithering matrix, the whole image dithering array being an X by Y array, and each element of the whole image dithering array corresponding to one of the plurality of pixels of the image;
for each pixel of the plurality of pixels, selecting the corresponding element of the whole image dithering array as the threshold value associated with the pixel
wherein the generating a whole image dithering array comprises:
dividing the plurality of pixels into a plurality of pixel groups, each of the plurality of pixel groups comprising an A by A group of pixels;
associating the default dithering matrix with a first pixel group of the plurality of pixel groups;
a modified dithering matrix to a second pixel group adjacent to the first pixel group, wherein the modified dithering matrix is a transformation of the default dithering matrix.

18. The non-transitory computer-readable medium of claim 17, wherein the transformation is a row swap.

19. The non-transitory computer-readable medium of claim 17, wherein the transformation is a column swap.

20. The non-transitory computer-readable medium of claim 17, wherein a plurality of modified dithering matrices are associated with the plurality of pixel groups in one to one correspondence; and
each modified dithering matrix of the plurality of modified dithering matrices is a transformation of adjacent modified dithering matrices.

21. The non-transitory computer-readable medium of claim 20, wherein transformation of the plurality of modified dithering matrices is cyclical such that every $A^{th}$ modified dithering matrix in a horizontal or vertical direction is identical.

* * * * *